(12) United States Patent
Khonkar

(10) Patent No.: US 8,203,820 B2
(45) Date of Patent: Jun. 19, 2012

(54) AUTOMATIC LIGHTNING SAFETY VALVE FOR WATER SUPPLY SYSTEM

(75) Inventor: Hussameldin I Khonkar, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 578 days.

(21) Appl. No.: 12/425,470

(22) Filed: Apr. 17, 2009

(65) Prior Publication Data

US 2010/0263729 A1    Oct. 21, 2010

(30) Foreign Application Priority Data

Nov. 8, 2008    (SA) ..................................... 8290711

(51) Int. Cl.
*H01H 47/00*    (2006.01)
(52) U.S. Cl. ....................................................... 361/160
(58) Field of Classification Search ............... 361/1, 160
See application file for complete search history.

(56) References Cited

U.S. PATENT DOCUMENTS

| 5,083,042 A * | 1/1992 | Merchant ...................... 307/149 |
| 5,453,899 A * | 9/1995 | Page .................................. 361/1 |
| 6,061,216 A * | 5/2000 | Fuqua, III .......................... 361/1 |

* cited by examiner

*Primary Examiner* — Stephen W Jackson
(74) *Attorney, Agent, or Firm* — Raj Abhyanker, P.C.

(57) ABSTRACT

A method, system and an apparatus to automatic lightning safety valve for water supply system are disclosed. An exemplary embodiment provides an apparatus of lightning protection. A sensor circuit of the apparatus receives a electromagnetic signal of an atmospheric electromagnetic field to generate a modified signal and to communicate the modified signal to a control circuit. A control circuit of the apparatus of the lightening circuit causes the valve to automatically close if the modified signal is greater than a specified value. The valve control device is communicatively coupled with the sensor circuit. The apparatus also includes a solenoid valve to stop the flow of a fluid into the structure by closing a fluid line.

23 Claims, 5 Drawing Sheets

AUTOMATIC LIGHTNING SAFETY VALVE FOR WATER SUPPLY SYSTEM

FIELD OF TECHNOLOGY

This disclosure relates generally to an enterprise method and more particularly to a methodology to provide an automatic lightning safety valve for a water supply system.

BACKGROUND

A structure may include a lightning protection system to protect the structure from lightning bolts. A lightning protection system may include a rooftop network of conductors, multiple conductive paths from the roof to the ground, bonding connections to metallic objects within the structure and a grounding network. However, the structure may also include a water supply line to deliver water to the interior of the building. Water is a conductor of electricity. Therefore, if a lightning bolt hits the water supply line, the lightning bolt may bypass the other components of the lightning protection system and enter the internal water distribution system of the structure. Someone inside the structure may be electrocuted. Electronics inside the structure may be damaged.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An apparatus, system and method of an automatic lightning safety valve for water supply system are disclosed.

An exemplary embodiment provides an apparatus of lightning protection. A sensor circuit of the apparatus receives an electromagnetic signal of an atmospheric electromagnetic field to generate a modified signal and to communicate the modified signal to a control circuit. A control circuit of the apparatus of the lightening circuit causes the valve to automatically close if the modified signal is greater than a specified value. The valve control device is communicatively coupled with the sensor circuit. The apparatus also includes a solenoid valve to stop the flow of a fluid into the structure by closing a fluid line.

An exemplary embodiment provides a method of lightning protection. An atmospheric electromagnetic field is measured. A signal representing a measurement of the atmospheric electromagnetic field is generated. A water supply line to a structure is automatically shut off if the measurement of the atmospheric electromagnetic field is greater than a specified value.

An exemplary embodiment provides a system of lightning protection. The system includes a structure and a waterline to convey water to the structure. The system also includes a solenoid valve to control the waterline at the boundary of the structure. An antenna of the lightning protection system receives an atmospheric electromagnetic signal. A signal processing circuit of the system processes the atmospheric electromagnetic signal and communicates a processed signal to solenoid valve.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying Drawings and from the Detailed Description that follows.

BRIEF DESCRIPTION OF THE VIEWS OF DRAWINGS

Example embodiments are illustrated by way of example and not limitation in the figures of the accompanying drawings, in which like references indicate similar elements and in which:

FIG. 1 diagrammatic view illustrating a lightening protection system to a structure, according to one embodiment.

Other features of the present embodiments will be apparent from the accompanying Drawings and from the Detailed Description that follows.

DETAILED DESCRIPTION

Several apparatus, method and system to automatic lightning safety valve for water supply system are disclosed.

Figure 1:
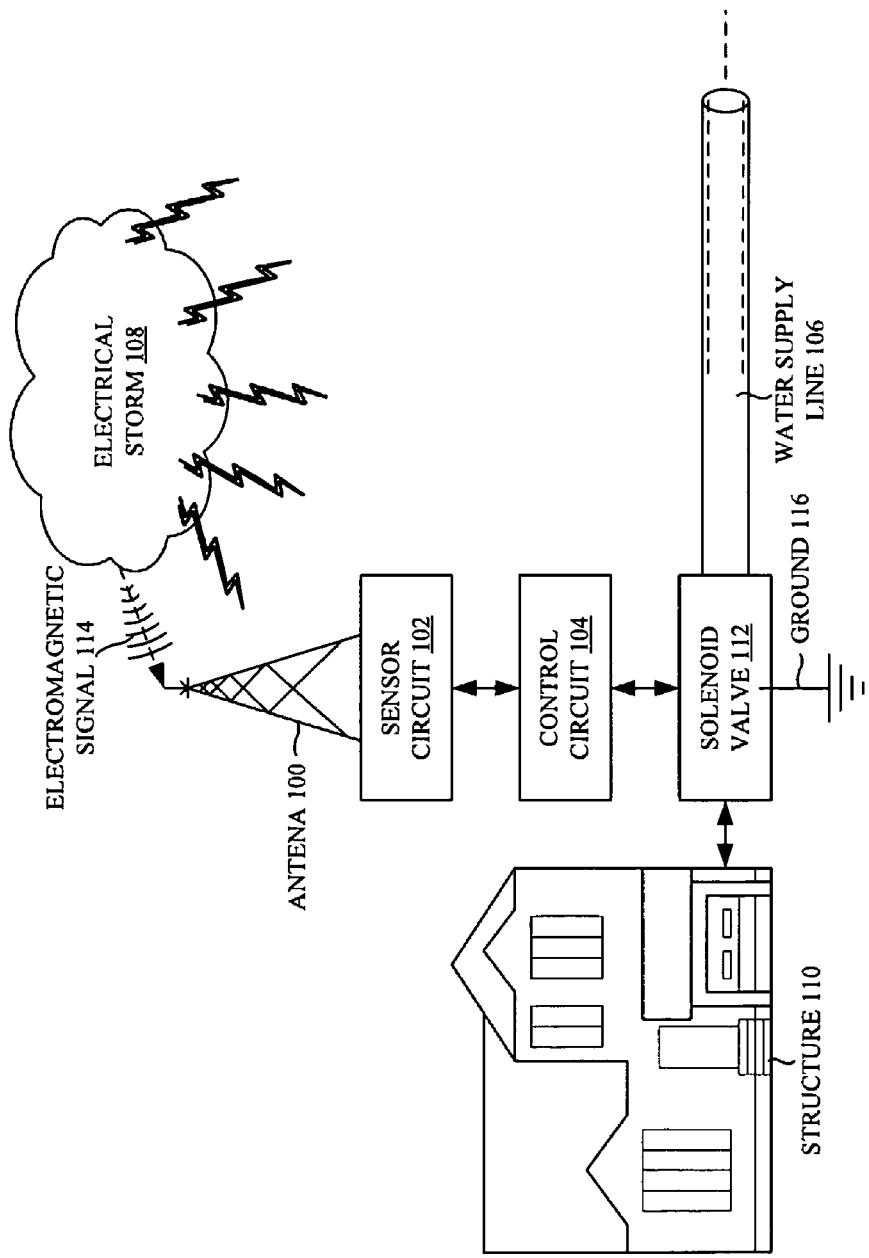

FIG. 1 diagrammatic view illustrating a lightening protection system to a structure, according to one embodiment. Particularly, FIG. 1 illustrates an antenna 100, a sensor circuit 102, a control circuit 104, a water supply line 106, an electrical storm 108, a structure 110, a solenoid valve 112, an electromagnetic signal 114, and a ground 116 according to one embodiment.

In an example embodiment the structure 110 may have the water supply line 106. The solenoid valve 112 may be coupled to the water supply line 106 and the control circuit 104. The solenoid valve 112 may be grounded. The control circuit 104 may be coupled to the sensor circuit 102. The sensor circuit 102 may be connected to the antenna 100. The antenna 100 may receive the electromagnetic signal 114 from the electrical storm 108.

The water supply line 106 may be an external source of water to the structure. The water supply line 106 may be vulnerable to a lightning strike. In other example, embodiments the water supply line 106 may include liquid and/or gaseous chemicals.

The sensor circuit 102 may include the antenna 100. The antenna may include a component designed to send and receive radio waves. In an example embodiment, the antenna may include an aerial antenna. In another example embodiment, the antenna 100 may include an array of antennas communicatively coupled with each other. The antenna 100 may include a transducer designed to transmit and/or receive electromagnetic waves. The sensor circuit 102 may convert electromagnetic waves received by the antenna into a modified signal and/or vice versa. The sensor circuit 102 may communicate the modified signal to the control circuit 104.

The control circuit 104 may include an interconnection of electrical elements including resistors, inductors, capacitors, transmission lines, voltage sources, current sources, and switches. The control circuit 104 may share a solenoid of the solenoid valve 112. The control circuit 104 may further communicate the modified signal to the solenoid. The control circuit 104 may transform the modified signal. For example, the control circuit 104 may filter the modified signal. The control circuit 104 may also strengthen the modified signal.

The solenoid valve 112 may include an electromechanical valve for use with a liquid and/or gas. The solenoid valve 112 may be controlled by running and/or stopping an electric current through a solenoid, in order to change the state of the valve. The solenoid valve 112 may convert electrical energy into mechanical energy which, in turn, opens or closes the valve mechanically. The solenoid valve 112 may include an electromechanical valve for use with a liquid and/or gas. The solenoid valve 112 may be controlled by running and/or stopping an electric current through a solenoid, in order to change the state of the valve. The solenoid may convert electrical energy into mechanical energy which, in turn, opens and/or closes the valve mechanically.

For example, the sensor circuit 102 may receive an electromagnetic signal 114 of a specified value indicating an imminent lightning strike from the electrical storm 108. The sensor circuit 102 may generate the modified signal from the electromagnetic signal 114. The sensor circuit 102 may communicate the modified signal to the control circuit 104. The control circuit 104 may further process the modified signal into a value capable of activating the solenoid valve 112. The solenoid valve 112 may then terminate the flow of a water through the water supply line 106. A current of a lightning strike to the water supply line 106 may then be conveyed to the ground 116.

Figure 2:
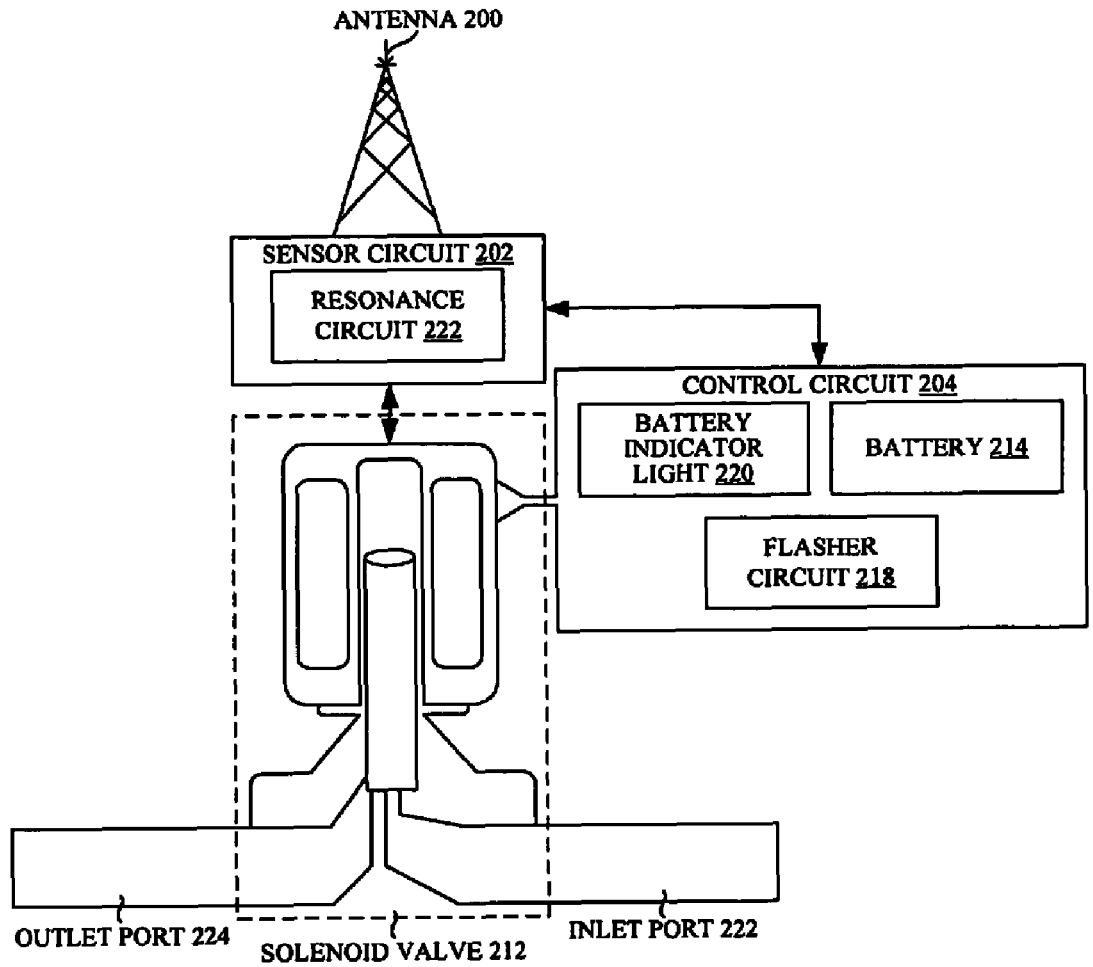
FIG. 2 is a systematic view illustrating correlation of solenoid valve with control circuit and sensor circuit, according to one embodiment.

FIG. 2 is systematic view illustrating correlation of solenoid valve with control circuit and sensor circuit, according to one embodiment. Particularly, FIG. 2 illustrates an aerial antenna 200, a sensor circuit 202, a control circuit 204, a battery 214, a solenoid valve 212, a flasher circuit 218, a battery indicator light 220, a resonance circuit 222, an outlet port 224 and an inlet port 222, according to one embodiment.

In an example embodiment the solenoid valve 212 may include the inlet port 222 and the outlet port 224. The solenoid valve 212 may be coupled with the control circuit 204 and the sensor circuit 202. The control circuit 204 may include the battery 214, the battery indicator light 220, and the flasher circuit 218. The sensor circuit 202 may include a resonance circuit 222. The control circuit 204 may communicate to the sensor circuit 202. The sensor circuit 202 may be connected to the antenna 100.

The battery 214 may include a device that converts chemical energy to electrical energy. The battery 214 may supply the electrical energy to the control circuit 204. The battery indicator light 220 may indicate that the battery 214 has fallen below a specified amount of chemical energy.

The resonance circuit 222 of the sensor circuit may adjust the modified signal to a specified frequency value. In one embodiment, the specified value may be a frequency value of 300 khz. The resonance circuit may include a capacitor communicatively coupled to at least two electric coil units.

The inlet port 222 may transport a dielectric fluid and/or gas (e.g. water) from an external supply line to the solenoid valve 212. The outlet port 224 of the solenoid valve may transport the dielectric fluid and/or gas to the structure 100.

Figure 3:
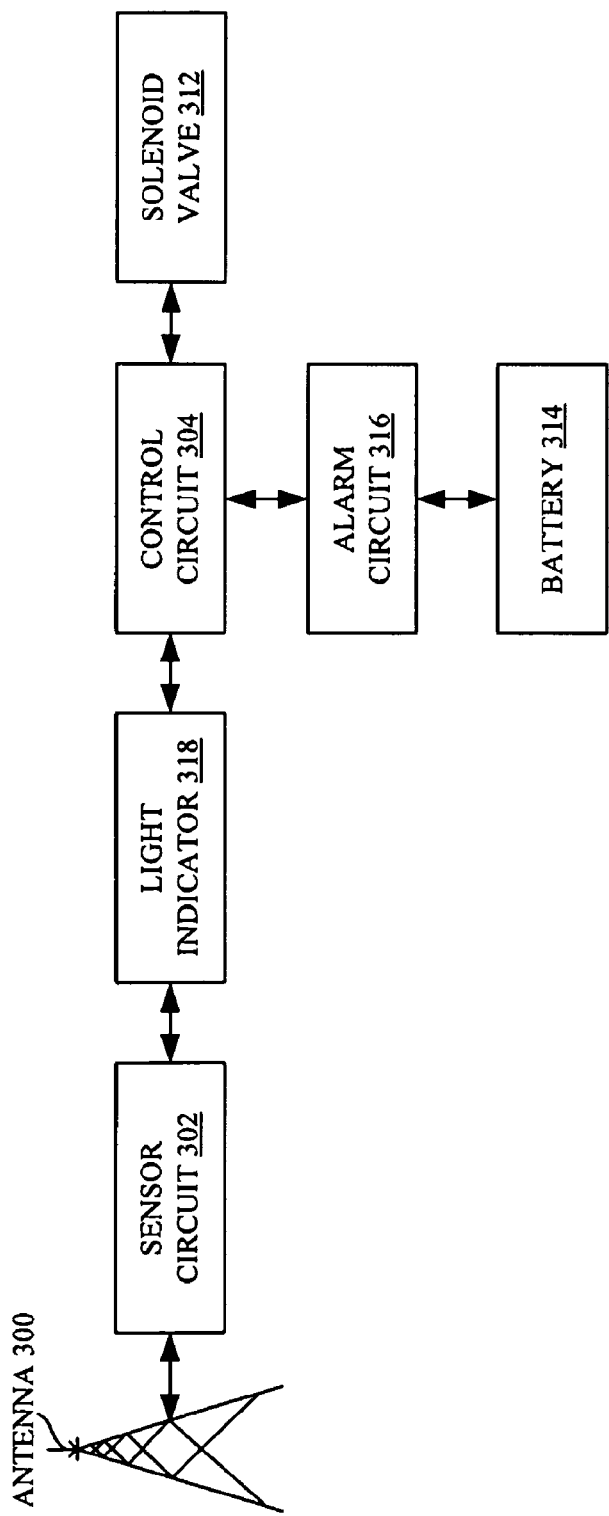
FIG. 3 is a schematic view illustrating association of circuits in the lightning protection system, according to one embodiment.

FIG. 3 is a schematic view illustrating association of circuits in the lightning protection system, according to one embodiment. Particularly, FIG. 3 illustrates antenna 300, a sensor circuit 302, a control circuit 304, a solenoid valve 312, a battery 314, a light indicator 318, and an alarm circuit 316, according to one embodiment.

In an example embodiment, the antenna 300 may be connected to the sensor circuit 302. The sensor circuit 302 may be coupled to the light indicator 318. The control circuit 304 may communicate with the light indicator 318 and the solenoid valve 312. The control circuit 304 may communicate with the alarm circuit 316. The alarm circuit 316 may be coupled to the battery 314.

According to a particular embodiment, the antenna 310 may receive an atmospheric electromagnetic signal. The sensor circuit 302 and the control circuit may be included in a signal processing circuit. The signal processing circuit may process the atmospheric electromagnetic signal and to communicate a processed signal to a solenoid of the solenoid valve 312. The alarm circuit 316 may indicate that the sensor circuit 302 has received an electromagnetic signal greater than the specified value. The alarm circuit 316 may indicate a specified probability that a lightning bolt may be produced by an electric storm 108. The solenoid valve 312 may control the waterline at the boundary of the structure. The solenoid valve 312 may block the flow of water in the waterline. The solenoid valve 312 may create an opening in the path of the water with a functional infinite resistance to a current produced by a lighting strike on the waterline.

Figure 4:
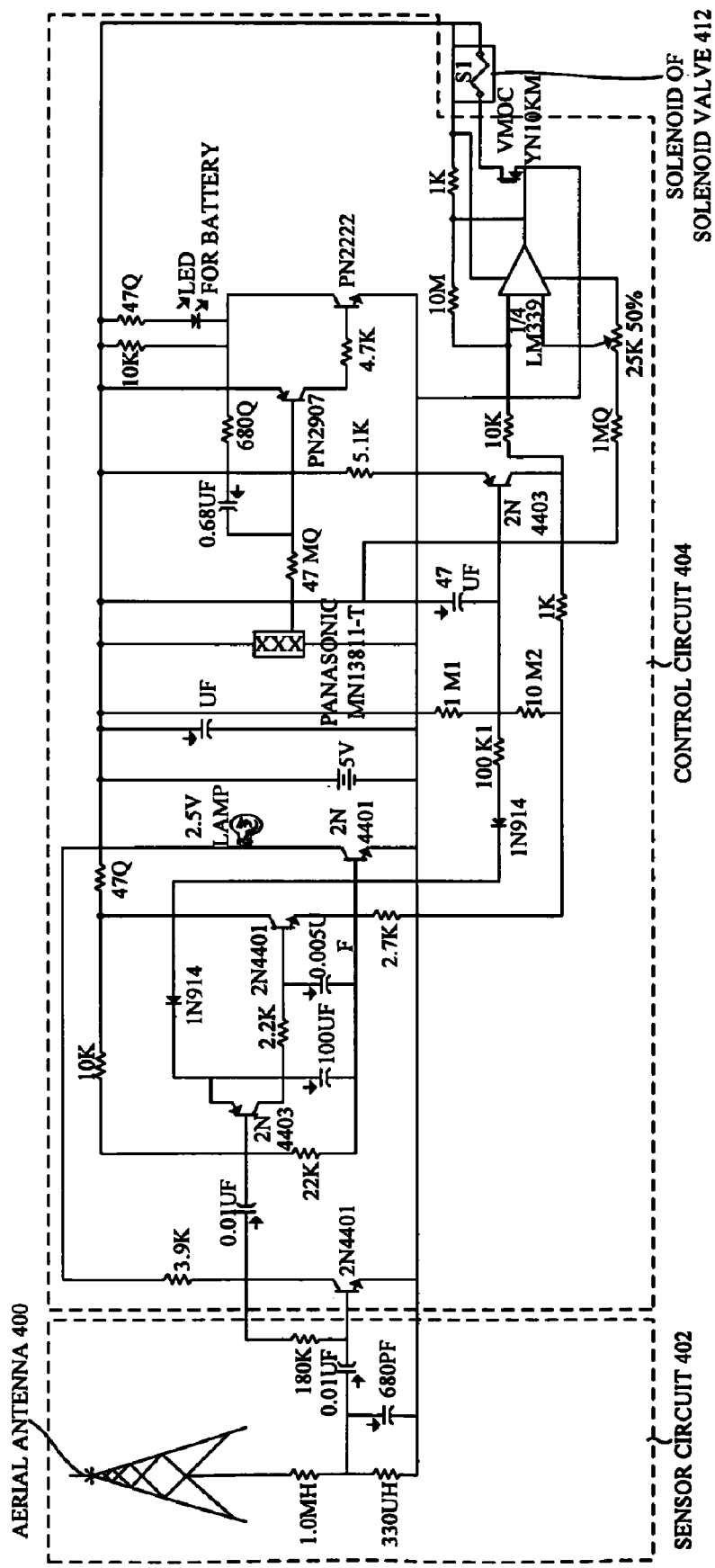
FIG. 4 is a schematic view illustrating association of a sensor circuit, a control circuit, and a solenoid valve, according to one embodiment.

FIG. 4 is a schematic view illustrating association of a sensor circuit, a control circuit, and a solenoid valve, according to one embodiment. Particularly, FIG. 4 illustrates an antenna 400, sensor circuit 402, a control circuit 404, and a solenoid of solenoid valve 412, according to one embodiment.

In an example embodiment the antenna may be connected to the sensor circuit 402. The sensor circuit 402 may be coupled to the control circuit 404. The control circuit may be coupled to the solenoid of solenoid valve 412.

The antenna 400 may include a transducer designed to transmit and/or receive electromagnetic waves. The control circuit 404 may include a power source to supply power to the control circuit and the sensor circuit. The control circuit 404 may include a power supply monitor to measure an electric potential energy value of the power source. The power source may include a battery. The power supply monitor may include a light emitting diode. The control circuit 404 may include a flasher circuit with another light emitting diode to indicate if the sensor circuit 402 has detected an electromagnetic wave above a specified threshold. The control circuit 404 may include a first transistor to amplify the modified signal. The control circuit 404 may include a second transistor with a switch functionality to reduce a potential difference value of the modified signal to less than another potential difference value of the modified signal at a capacitor communicatively coupled to the second transistor. The second transistor may be communicatively coupled with the first transistor. The control circuit 404 may include a third transistor with a switch functionality. The third transistor may be communicatively coupled with the second transistor. The control circuit 404 may include a fourth transistor and a light emitting device, and wherein the fourth transistor and the light emitting device are communicatively coupled with the third transistor. The control circuit 404 may include a rectifier circuit, comprising at least one diode and at least one capacitor to transform an alternating current of the modified signal to a direct current. The control circuit 404 may include a variable resistance circuit comprising at least one other diode communicatively coupled with a voltage source, and wherein the variable resistance current diode impedes a positive voltage from being communicated to the fifth transistor if a positive voltage value is less than a voltage of the voltage source. The variable resistance circuit communicates a positive voltage to the fifth transistor. The control circuit 404 may include an operational amplifier to combine the modified signal and the voltage of the voltage source. The operational amplifier may be communicatively coupled with the fifth transistor and a solenoid of the solenoid valve. The control circuit 404 may include a sixth transistor to function as a switch and to render the modified signal to the solenoid if the value of the modified signal is at least one of equal to and greater than the voltage of the voltage source.

The control circuit 404 may also include a second flasher circuit composed of two transistors (in case the potential difference is less than 4.7 v). The modified signal may be received by an LED to indicate that the energy coming from the battery is about to come to an end.

Figure 5:
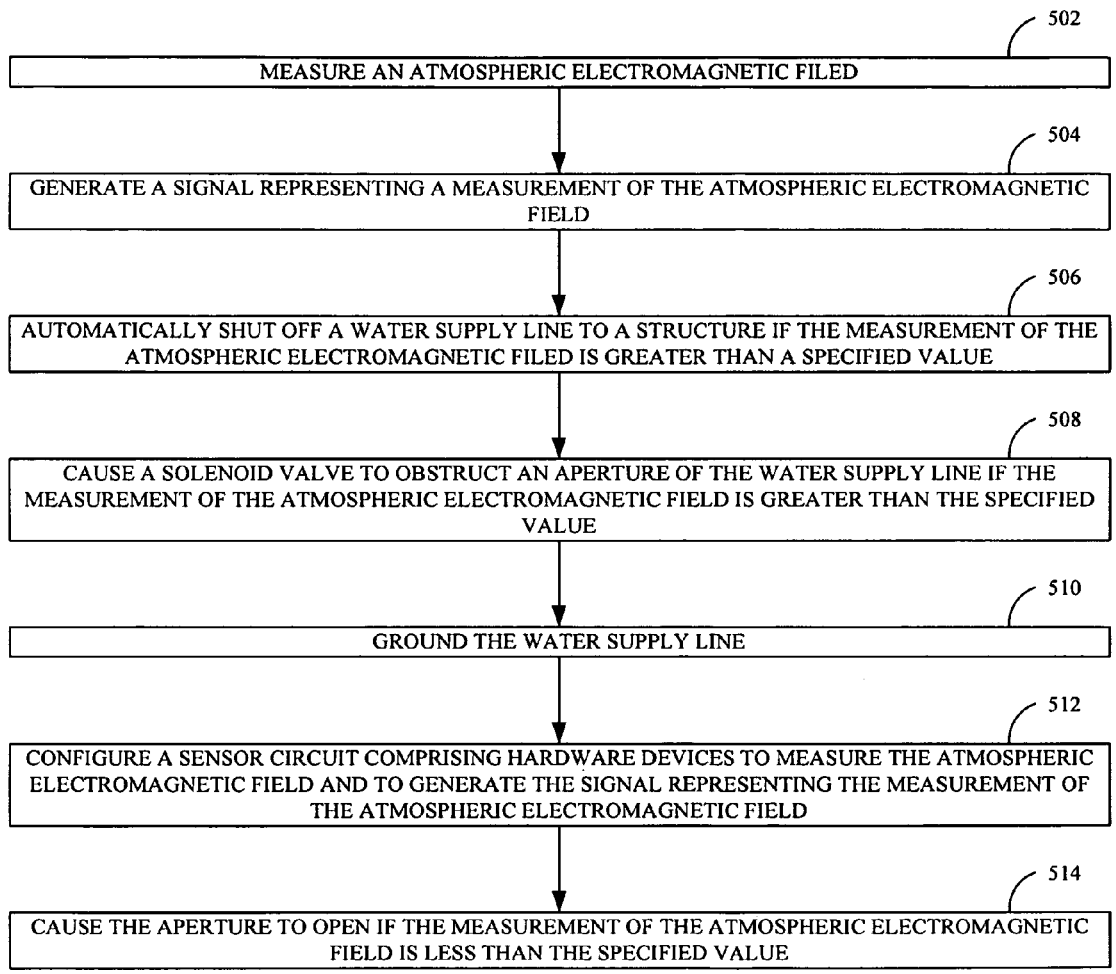
FIG. 5 is a process flow that illustrates a method of lighting protection to water supply system, according to another embodiment.

FIG. 5 is a process flow that illustrates a method of lighting protection to water supply system, according to another embodiment. In operation 502, an atmospheric electromagnetic field may be measured. In operation 504, a signal representing a measurement of the atmospheric electromagnetic field may be generated. In operation 506, a water supply line 106 to a structure 110 may be automatically shut off if the measurement of the atmospheric electromagnetic field is greater than a specified value. For example the specified value may be 300 kHz. In operation 508, a solenoid valve 112 may be caused to obstruct an aperture of the water supply line 106 if the measurement of the atmospheric electromagnetic field is greater than the specified value. The water supply line to the structure 110 may flow through the aperture.

In operation 510, the water supply line 106 may be grounded. The valve may include a non conducting material to insulate an internal water supply line of the structure 110 from the electric charge of the lightning bolt in the external water supply line. The specified value of the measurement of the atmospheric electromagnetic field may indicate a substantial probability of an atmospheric discharge of electricity within a specified range from the structure 110.

In operation 512, a sensor circuit 202 including hardware devices may be configured to measure the atmospheric electromagnetic field and to generate the signal representing the measurement of the atmospheric electromagnetic field. In operation 514, the aperture may be caused to open if the measurement of the atmospheric electromagnetic field is less than the specified value. For example, a valve control device may open the solenoid valve 112 if the processed signal indicates the atmospheric electromagnetic signal is less than the specified value.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry, firmware, software or any combination of hardware, firmware, or software embodied in a machine readable medium. For example, the various electrical structures and methods may be embodied using transistors, logic gates, application specific integrated (ASIC) circuitry or Digital Signal Processor (DSP) circuitry.

In addition, it will be appreciated that the various operations, processes, and methods disclosed herein may be embodied in a machine-readable medium or a machine accessible medium compatible with a data processing system, and may be performed in any order. Accordingly, the Specification and Drawings are to be regarded in an illustrative rather than a restrictive sense.

What is claimed is:

1. An apparatus of lightning protection, comprising:
   a sensor circuit to receive an electromagnetic signal of an atmospheric electromagnetic field, to generate a modified signal and to communicate the modified signal to a control circuit;
   the control circuit to cause a solenoid valve to automatically close if the modified signal is greater than a specified value, and wherein the control circuit is communicatively coupled with the sensor circuit;
   the solenoid valve to stop the flow of a fluid into a structure by closing a fluid line; and
   a resonance circuit of the sensor circuit to set the modified signal to a specified frequency value.

2. The apparatus of claim 1, wherein the resonance circuit comprises a capacitor communicatively coupled to at least two electric coil units.

3. The apparatus of claim 2, wherein the specified frequency value comprises 300 khz.

4. The apparatus of claim 1, wherein the sensor circuit comprises a radio antenna to receive the radio signal of the atmospheric electromagnetic field.

5. The apparatus of claim 4 further comprising:
   a power source to supply power to the control circuit and the sensor circuit; and
   a power supply monitor to measure an electric potential energy value of the power source.

6. The apparatus of claim 5,
   wherein the power source comprises a battery to supply a direct current to a power supply monitor circuit, and
   wherein the power supply monitor circuit comprises a light emitting diode.

7. The apparatus of claim 6 further comprising:
   a flasher circuit to visually indicate when the modified signal is greater than the specified value.

8. The apparatus of claim 7, wherein the control circuit comprises:
   a first transistor to amplify the modified signal,
   a second transistor with a switch functionality to reduce a potential difference value of the modified signal to less than an other potential difference value of the modified signal at a capacitor communicatively coupled to the second transistor, and wherein the second transistor is communicatively coupled with the first transistor,
   a third transistor with a switch functionality, and wherein the third transistor is communicatively coupled with the second transistor,
   a fourth transistor and a light emitting device, and wherein the fourth transistor and the light emitting device are communicatively coupled with the third transistor,
   a rectifier circuit comprising at least one diode and at least one capacitor to transform an alternating current of the modified signal to a direct current,
   a variable resistance circuit comprising at least one other diode communicatively coupled with a voltage source, and wherein the variable resistance current diode impedes a positive voltage from being communicated to the fifth transistor if a positive voltage value is less than a voltage of the voltage source, and wherein the variable resistance circuit communicates a positive voltage to a fifth transistor,
   an operational amplifier to combine the modified signal and the voltage of the voltage source, and wherein the operational amplifier is communicatively coupled with the fifth transistor and a solenoid of the solenoid valve,
   a sixth transistor to function as a switch to render the modified signal to the solenoid if the value of the modified signal is at least one of equal to and greater than the voltage of the voltage source.

9. The apparatus of claim 1, further comprising a ground coupled to the solenoid valve.

10. A method of lightning protection comprising:
measuring an atmospheric electromagnetic field;
generating a signal representing a measurement of the atmospheric electromagnetic field;
automatically shutting off a water supply line to a structure if the measurement of the atmospheric electromagnetic field is greater than a specified value; and
causing a solenoid valve to obstruct an aperture of the water supply line if the measurement of the atmospheric electromagnetic field is greater than the specified value.

11. The method of claim 10, wherein the water supply line to the structure flows through the aperture.

12. The method of claim of claim 11 further comprising:
grounding the water supply line.

13. The method of claim 11, wherein the valve comprises a non-conducting material to insulate an internal water supply line of the structure from the electric charge of the lightning bolt in the external water supply line.

14. The method of claim 13, wherein the specified value of the measurement of the atmospheric electromagnetic field indicates a substantial probability of an atmospheric discharge of electricity within a specified range from the structure.

15. The method of claim 14 further comprising:
configuring a sensor circuit comprising hardware devices to measure the atmospheric electromagnetic field and to generate the signal representing the measurement of the atmospheric electromagnetic field.

16. The method of claim 15 further comprising:
causing the aperture to open if the measurement of the atmospheric electromagnetic field is less than the specified value.

17. A system of lightning protection, comprising:
a structure;
a waterline to convey water to the structure;
a solenoid valve to control the waterline at the boundary of the structure;
an antenna to receive an atmospheric electromagnetic signal;
a signal processing circuit to process the atmospheric electromagnetic signal and to communicate a processed signal to the solenoid valve; and
a ground coupled to the solenoid valve,
wherein the solenoid valve opens if the processed signal indicates the atmospheric electromagnetic signal is less than the specified value.

18. A method of lightning protection comprising:
measuring an atmospheric electromagnetic field through a sensor circuit;
generating a signal representing a measurement of the atmospheric electromagnetic field through the sensor circuit;
automatically shutting off a water supply line to a structure if the measurement of the atmospheric electromagnetic field is greater than a specified value; and
setting the signal representing the measurement of the atmospheric electromagnetic field to a specified frequency value.

19. A system of lightning protection, comprising:
a structure;
a waterline to convey water to the structure;
a solenoid valve to control the waterline at the boundary of the structure;
an antenna to receive an atmospheric electromagnetic signal;
a signal processing circuit to process the atmospheric electromagnetic signal and to communicate a processed signal to the solenoid valve; and
a resonance circuit of the sensor circuit comprised in the signal processing circuit to set a modified signal generated through the sensor circuit to a specified frequency value.

20. An apparatus of lightning protection, comprising:
a sensor circuit to receive an electromagnetic signal of an atmospheric electromagnetic field, to generate a modified signal and to communicate the modified signal to a control circuit;
the control circuit to cause a solenoid valve to automatically close if the modified signal is greater than a specified value, and wherein the control circuit is communicatively coupled with the sensor circuit; and
the solenoid valve to stop the flow of a fluid into a structure by closing a fluid line,
wherein the solenoid valve to obstruct an aperture of a water supply line if a measurement of the atmospheric electromagnetic field is greater than a specified value.

21. A system of lightning protection, comprising:
a structure;
a waterline to convey water to the structure;
a solenoid valve to control the waterline at the boundary of the structure;
an antenna to receive an atmospheric electromagnetic signal;
a signal processing circuit to process the atmospheric electromagnetic signal and to communicate a processed signal to the solenoid valve; and
wherein the solenoid valve to obstruct an aperture of a water supply line if a measurement of an atmospheric electromagnetic field is greater than a specified value.

22. A method of lightning protection comprising:
measuring an atmospheric electromagnetic field through a sensor circuit;
generating a signal representing a measurement of the atmospheric electromagnetic field through the sensor circuit;
automatically shutting off a water supply line to a structure if the measurement of the atmospheric electromagnetic field is greater than a specified value; and
coupling a ground to a solenoid valve, wherein the solenoid valve opens if a processed signal received from a signal processing circuit comprising at least one of the sensor circuit and a control circuit indicates the atmospheric electromagnetic signal is less than the specified value.

23. An apparatus of lightning protection, comprising:
a sensor circuit to receive an electromagnetic signal of an atmospheric electromagnetic field, to generate a modified signal and to communicate the modified signal to a control circuit;
the control circuit to cause a solenoid valve to automatically close if the modified signal is greater than a specified value, and wherein the control circuit is communicatively coupled with the sensor circuit; and
the solenoid valve to stop the flow of a fluid into a structure by closing a fluid line;
a ground coupled to the solenoid valve,
wherein the solenoid valve opens if a processed signal received from a signal processing circuit comprising at least one of the sensor circuit and the control circuit indicates an atmospheric electromagnetic signal is less than the specified value.

* * * * *